US006179952B1

(12) United States Patent
Sprangér

(10) Patent No.: US 6,179,952 B1
(45) Date of Patent: Jan. 30, 2001

(54) PRESSURE SEALER THREE TIERED SEALING ROLL CONFIGURATION

(75) Inventor: Lee T. Spranger, Dover, NH (US)

(73) Assignee: Moore U.S.A. Inc., Grand Island, NY (US)

( * ) Notice: Under 35 U.S.C. 154(b), the term of this patent shall be extended for 0 days.

(21) Appl. No.: 09/156,672

(22) Filed: Sep. 18, 1998

(51) Int. Cl.[7] ...................................................... B32B 31/04

(52) U.S. Cl. .......................... 156/290; 156/555; 156/582; 156/553

(58) Field of Search .................................... 156/290, 553, 156/555, 580, 581, 582

(56) References Cited

U.S. PATENT DOCUMENTS

| | | | |
|---|---|---|---|
| 4,033,807 | 7/1977 | Neill et al. | 156/384 |
| 4,487,845 | 12/1984 | Schöllkopf | 156/324 |
| 4,900,391 * | 2/1990 | Mandel et al. | 156/364 |
| 5,049,227 | 9/1991 | Long et al. | 156/362 |
| 5,169,489 | 12/1992 | Kalisiak et al. | 156/555 |
| 5,378,303 | 1/1995 | Traise | 156/555 |
| 5,387,303 | 2/1995 | Azuma | 156/179 |
| 5,397,427 | 3/1995 | Traise et al. | 156/555 |
| 5,452,851 | 9/1995 | Albert et al. | 229/301 |
| 5,527,416 | 6/1996 | Traise | 156/290 |

FOREIGN PATENT DOCUMENTS

| | | |
|---|---|---|
| 1173776 | 12/1969 | (GB) . |
| WO 98/07583 | 2/1998 | (WO) . |

* cited by examiner

*Primary Examiner*—James Sells
(74) *Attorney, Agent, or Firm*—Nixon & Vanderhye P.C.

(57) ABSTRACT

Business forms with pressure activated adhesive or cohesive are handled by a sealing apparatus which has a reduced weight, foot print of equipment, and lower cost to the end user, because of its simple construction. First, second and third rollers are provided which have axes of rotation that are vertically spaced from each other and are preferably substantially vertically aligned, with the second roller between the first and third rollers. The forms pass through a first nip between the first and second rollers, are re-directed, and then pass through the second nip between the second and third rollers. Preferably forms pass through both nips at the same time to maximize the pressure in both nips. Typically, when passing through each of the nips the rollers exert a force of between about 100–200 pounds per lineal inch. Preferably all of the rollers are driven, such as by a motor connected to the second roller, and with gears acting between the second roller and the first and third rollers.

27 Claims, 2 Drawing Sheets

PRESSURE SEALER THREE TIERED SEALING ROLL CONFIGURATION

BACKGROUND AND SUMMARY OF THE INVENTION

Business forms with pressure activated adhesive or cohesive have become increasingly popular because of numerous practical advantages associated therewith. These adhesives (such as sold by Toppan Forms Company of Japan with a trade designation TN124, and as disclosed in U.S. Pat. Nos. 4,918,128, 5,190,818, 5,314,944 and 5,427,851) require application of a substantial force in order to effect sealing. A wide variety of different pieces of pressure seal equipment have been developed for that purpose, such as sold by Moore U.S.A., Inc. of Lake Forest, Ill. under the trademark "SpeediSealer", and such as shown in U.S. Pat. Nos. 5,169,489, 5,378,303, 5,397,427 and 5,527,416 (the disclosures of which are hereby incorporated by reference herein). While this commercial equipment is very useful in effecting proper sealing and handling of business forms with pressure activated adhesive or cohesive, it would be desirable to reduce the weight of the equipment, reduce its foot print, and provide a lower cost to the end user.

According to the present invention a method of handling business forms with pressure activated adhesive or cohesive thereon, and sealing apparatus that can be utilized with such business forms (or with other webs or sheets) is provided which has a number of advantages over conventional methods and equipment under some circumstances. The equipment provided according to the invention can have reduced weight, a reduced foot print, and a lower cost to the end user than equipment such as described above since the number of rollers utilized to effect the sealing action is reduced, and they can be positioned in such a way as to have a small foot print. Despite reduced weight, foot print, and cost, the equipment according to the invention can substantially effectively seal business forms as conventional equipment for that purpose.

According to one aspect of the present invention a method of handling business forms with pressure activated adhesive or cohesive thereon using at least first, second and third rollers each having an axis of rotation, and the axes of rotation being vertically spaced from each other so that the second roller axis is at a vertical location intermediate the first and third roller axes, and a first nip is formed between the first and second rollers and a second nip is formed between the second and third rollers is provided. The method comprises: (a) Feeding a business form with pressure activated adhesive or cohesive thereon into and through the first nip to effect compression. (b) Changing the direction of movement of the business form to direct the business form toward the second nip. And (c) feeding the business form into and through the second nip to effect sealing of the pressure activated adhesive or cohesive on that part of the business form between the rollers.

Typically (c) is practiced to apply a force to the business form between the second and third rollers of between about 100–200 lineal pounds per inch, and (a) is practiced to also apply the same general level of force, e.g. between about 100–200 pounds per lineal inch. (a) and (c) are also preferably practiced to operate on two different forms at the same time, that is one form goes through the first nip while a second form is passing through the second nip. This maximizes the pressure in both the compression and sealing phases (that is between the first and second nips).

(b) may be practiced by feeding the business form into contact with a substantially semicircular stationary surface, or by using a plurality of sets of re-directing rollers, with or without stationary guides associated with them. Any other conventional equipment can also be used which effectively allows re-direction of a form once passing through the first nip to the second nip.

The business forms may be constructed to have pressure activated cohesive or adhesive in strips along two peripheral portions thereof, and (a) and (c) may be practiced (using rollers designed for that purpose) to act substantially only on the peripheral portions of the form. This is particularly useful when the form is to have inserts and it is desired not to "crush" the inserts. Alternatively, however, especially where inserts are not used in the form, and the form has a width substantially transverse to the primary direction that it moves through the nips, (a) and (c) are practiced to act along substantially the entire width of the business form. In such a case typically the form has at least some pressure activated adhesive or cohesive extending substantially parallel to the width thereof, and the rollers seal the form both where there are longitudinal and transverse strips of adhesive or cohesive.

In the practice of the method, the roller axes may be substantially vertically aligned so as to provide a minimum foot print, when (a) through (c) are practiced, and (a)–(c) are typically also practiced by driving each of the first, second and third rollers.

According to another aspect of the present invention sealing apparatus is provided, which is utilizable with the business forms as described above, or perhaps also utilizable for other webs or sheets. Sealing apparatus comprises the following components: A plurality of rollers, including at least first, second, and third rollers, each having an axis of rotation, and the axes of rotation being substantially vertically aligned with each other and the second roller axis provided at a vertical location intermediate the first and third roller axes. A first nip formed between the first and second rollers, and a second nip formed between the second and third rollers. And means for changing the direction of movement of a web or sheet passing through the first nip to direct the web or sheet toward the second nip, while the web or sheet is spaced from the second roller when moving between nips.

In the sealing apparatus according to the invention preferably all three (or more) of the rollers are driven. For example, the second roller is operatively connected to a motor and the first and third rollers are geared to the second roller. The plurality of rollers may consist of the first, second and third rollers. The means for changing the direction of movement of a web or sheet passing through the first nip to direct the web or sheet toward the second nip may comprise a substantially semicircular stationary surface, or a plurality of sets of re-directing rollers with or without associated stationary guides. However, any other conventional or to be developed structure may be used that performs the function of changing the direction of movement of the web or sheet (business form) to direct the web or sheet from the first nip toward the second nip, though the web or sheet is spaced from the second roller when moving between the nips.

The rollers may be positioned and constructed so that the second and third rollers apply a force of at least about 100 pounds per lineal inch, and preferably between about 100–200 pounds per lineal inch therebetween. Similarly, the rollers are preferably positioned and constructed so that the first and second rollers apply a force of between about 100–200 pounds per lineal inch.

The rollers may have a diameter of about 2–4 inches in most circumstances, and can either have a short axial length (5inches or less) to act merely along one edge of the business form or other web or sheet, or segmented rollers can be provided on a shaft which are spaced from each other to act on separate longitudinal edges of the business form, or other web or sheet, passing between them. Alternatively, a continuous roller extending across the entire width of a web or sheet (e.g. business form) to be acted upon may be provided. The rollers can be made of any suitable materials or have any suitable configuration, for example, such as shown in U.S. Pat. Nos. 5,169,489, 5,378,303, 5,397,427 and 5,527,416.

It is the primary object of the present invention to provide a sealing apparatus which has a reduced weight, reduced foot print, and lower cost to the end user, than conventional equipment for sealing business forms having pressure activated adhesive or cohesive thereon, and a method of acting on business forms using such equipment. This and other objects of the invention will become clear from an inspection of the detailed description of the invention and from the appended claims.

DETAILED DESCRIPTION OF THE DRAWINGS

Figure 1:
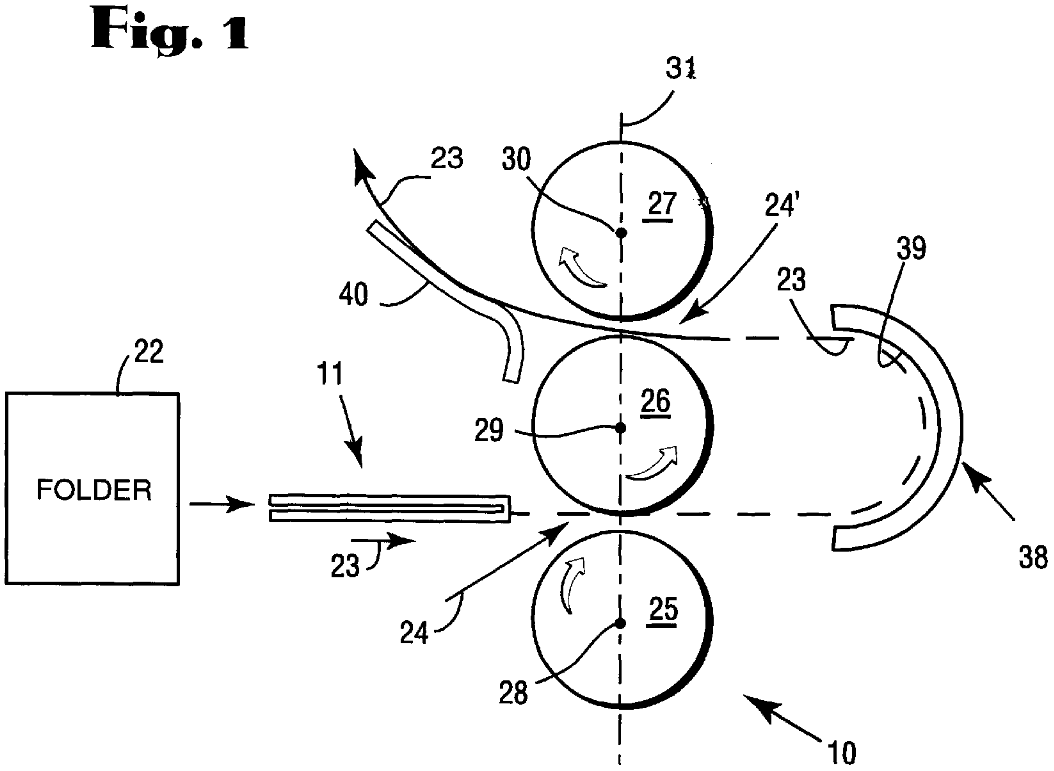
FIG. 1 is a schematic side view of exemplary apparatus for handling business forms according to the present invention.
Figure 2:
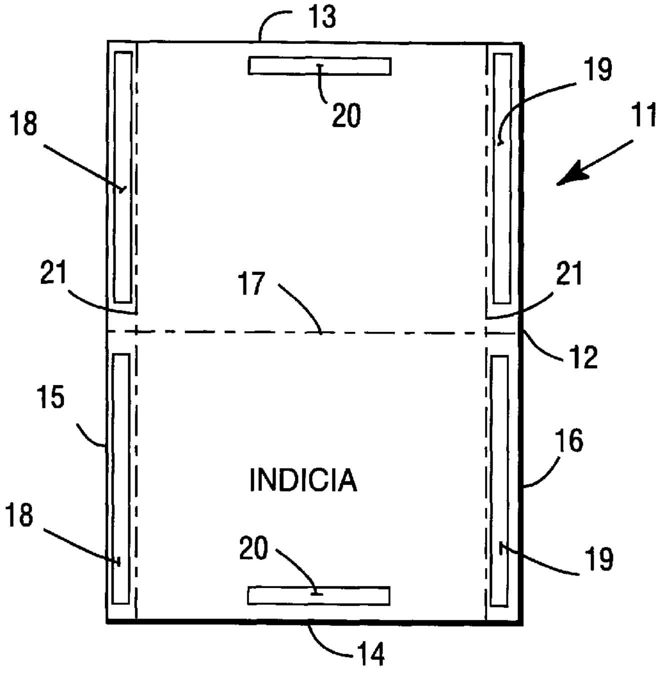
FIG. 2 is a top plan view of an exemplary business form utilized with the equipment of FIG. 1 before folding thereof.
Figure 3:
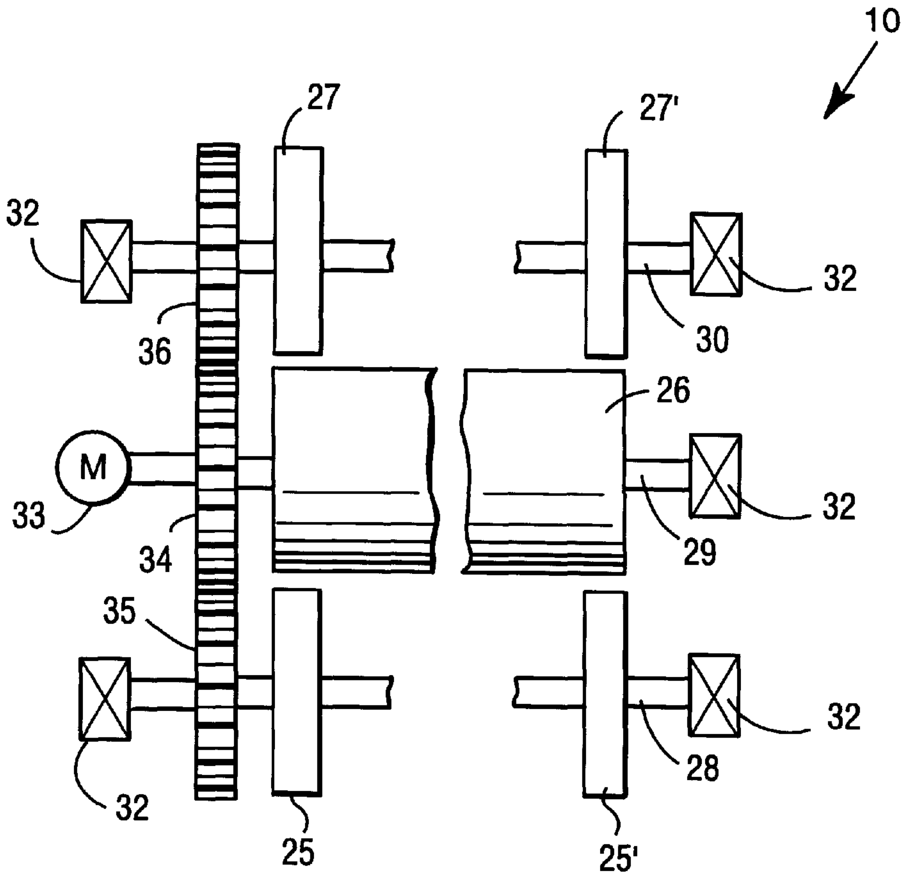
FIG. 3 is a schematic end view showing bearings and drives of exemplary rollers of the apparatus of FIG. 1.

Exemplary sealing apparatus 10 for sealing business forms 11 in the practice of the method according to the present invention is shown schematically in FIGS. 1 and 3. The business forms 11 with which the apparatus 10 are typically used—as seen in detail in one exemplary embodiment in FIG. 2 (before folding)—typically comprises mailer type business forms typically formed of a single sheet of paper 12 having end edges 13, 14 substantially parallel to each other—and side edges 15, 16 substantially parallel to each other and substantially transverse to the end edges 13, 14. The sheet 12 has one or more fold lines 17 and cooperating marginal patterns (e.g. strips) of pressure activated adhesive or cohesive 18, 19 as well as possibly transverse patterns (strips) 20. Perforation lines 21, or like lines of weakness, define tear-off strips in which the longitudinal strips 18, 19 are provided. The pressure activated adhesive or cohesive 18–20 may be the commercial TN124 product, and/or the other products as described in the patents referenced above.

For the particular business form 11 illustrated in FIGS. 1 and 2, it comprises a V-fold form, in which the sheet 12 is folded about the fold lines 17 so that the strips 18 come into contact with other, and the strips 19 into contact with each other, and the strips 20—if present—come into contact with each other. By applying suitable pressure to the outside of the form the strips 18–20 are sealed to each other.

While a V-fold form is illustrated in FIGS. 1 and 2 it is to be understood that virtually any form configuration can be provided, including C-fold (including eccentric C-fold), Z-fold (including eccentric Z-fold), double fold, or even overlapping sheets or webs unattached at all four edges. The business forms of course typically have indicia printed on the inside panels (and address indicia on the outside of the mailer), and may or may not include inserts.

Typically, a mailer 11 is passed into conventional automatic folder 22 (see FIG. 1), at which it is folded about the fold lines 17, and then passes in the path 23 to a first nip 24 disposed between first and second rollers 25, 26, respectively, the rollers 25, 26 being part of a set of a plurality of rollers which also includes at least the third roller 27, and sometimes the roller set consisting of the rollers 25, 26, 27. Each of the rollers 25–27 is rotatable about an axis of rotation 28, 29, 30, respectively. Preferably the axes of rotation 28–30 are substantially horizontal, and are vertically spaced from each other. In the preferred embodiment illustrated the axes 28–30 are substantially vertically aligned, as indicated by the common center line 31. A second nip 24' is provided between the second and third rollers 26, 27, the second roller 26 being vertically intermediate the rollers 25, 27. While in the preferred embodiment the first roller 25 is the lowest roller, the apparatus 10 may be constructed so that the roller 27 is the lowest roller.

While the rollers 25–27 may have a wide variety of different constructions and be mounted with respect to each other in a wide variety of manners, one such manner is schematically illustrated in FIG. 3 in which each of the axes 28–30 is defined by a shaft with the same reference numeral, the shaft mounted at its ends (and perhaps at intermediate locations) by conventional bearings 32, and a second roller 26 driven by a conventional motor (such as an electric motor) 33. Preferably all three rollers 25–27 are driven. This may be accomplished, for example, by driving the shaft 29 for roller 26 with the motor 33, with a suitable gearing arrangement—illustrated schematically by the gears 34–36 in FIG. 10—for driving the shafts 28, 30 /rollers 25, 27, the rollers rotating in the direction illustrated by the arrows in FIG. 1.

For simplicity of illustration in FIGS. 1 and 3 the rollers 25–27 are shown spaced from each other, but it is to be understood that they may be biased (e.g. with coil or other springs) together or into contact with each other, or otherwise mounted so that they provide high compression and sealing forces to the business form 11 or like sheets or webs passing between them. Preferably, for both the compression stage defined by the first nip 24 and the sealing stage defined by the second nip 24', a high force is applied by the rollers 25–27 to the business form 11 or the like. For example, in both of the stages defined by the nips 24, 24' a force of at least about 100 pounds per lineal inch, preferably a force between about 100–200 pounds per lineal inch. The axes/shafts 28–30 are preferably substantially vertically aligned as indicated at 31 in FIG. 1 so that different forms (or the same web) can be present in both the nips 24, 24' at the same time, maximizing the pressure in both the compression and sealing stages defined by the nips 24, 24'.

The rollers 25–27 may have any of the configurations such as illustrated in the rollers shown in U.S. Pat. Nos. 5,169,489, 5,378,303, 5,397,427 and 5,527,416. The rollers may be constructed so that they have a small width (axial length), e.g. less than 5 inches, and typically have a diameter of about 2–4 inches. If they have such a small width, which is used for only edge sealing forms (e.g. just along where the strips 18, 19 are) then distinct sets of rollers corresponding to each of the rollers 25–27 may be provided. Alternatively, the distinct small axial edge sealing rollers may be mounted on the common shafts 28, 30, with the roller segments 25, 25' and 27, 27' spaced from each other a distance corresponding to the spacing of the adhesive/cohesive strips 18, 19 expected. The roller 26 may also have a small axial width like that of the roller segments 27, 27' and 25, 25', or may extend the complete length of the shaft 29, and the position of at least one of the rollers 25, 25' or 27, 27' may be adjustable along the length of the shafts 28, 30 (such as by using conventional splines, set screws, etc.). Alternatively, all of the rollers 25–27 may be long, so that they do not merely seal along the peripheral edges of the form 11, but rather seal across the entire width of the form 11, including any transverse strips of adhesive/cohesive, such as the strips 20, illustrated in FIG. 2. Edge sealing is preferred when there are substantial inserts, whereas steam roll sealing (across the entire width of the form 11 moving in the path 23) is preferred when there are no inserts.

The preferred sealing apparatus according to the present invention also comprises a means for changing the direction of movement of a web or sheet (e.g. business form 11) passing through the first nip 24 to direct the web or sheet (e.g. business form 11) toward the second nip 24' while the web or sheet (e.g. business form 11) is spaced from the second roller 26 when moving between nips 24, 24'. Such means may comprise any conventional or subsequently developed structure that is capable of performing that change of direction of movement function, and particularly so that in the preferred embodiment one business form 11 may be in the compression stage between the rollers 25, 26 at nip 24, while another business form is in the sealing stage at nip 24'. Two different embodiments are illustrated for structures that may be used as the means for changing the direction of movement, one illustrated in FIG. 1 and the other in FIG. 4.

FIG. 1 schematically illustrates one form of the means for changing the direction of the web 38 comprising a substantially semicircular stationary surface 39 which engages the business form 11 or other web or sheet and re-directs the path of movement 23 of the business form 11 or the like so that it moves toward the nip 24'. For clarity of illustration the structure 38 is illustrated in FIG. 1 widely spaced from the rollers 25–27, but it typically would be located closer thereto, depending upon the dimensions of the business form 11 or the like. The surface 39 may be made of a low friction material, such as polytetrafluorethylene, or may have rollers or like low friction devices thereon. Alternatively, the surface 39 may have a like surface associated therewith defining a gap between them to define a positive guide to the form 11 as it moves in the path 23.

After the form 11 or the like exits the nip 24' it typically is deflected, as indicated by the conventional stationary deflector 40 in FIG. 1, then moves to any subsequent handling desired, using any suitable equipment for that purpose. For example, other sets of driven rollers may engage the business form 11, move it to a stack, a pallet, a conveyor, or any other suitable location or equipment.

Figure 4:
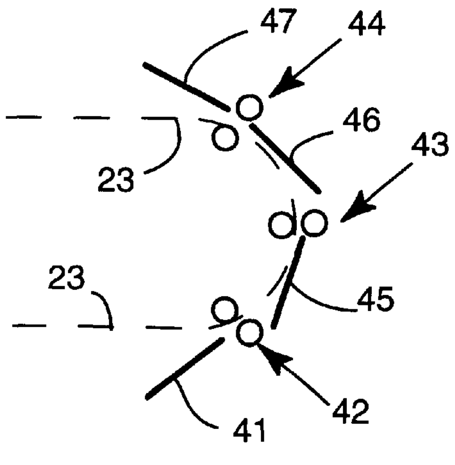
FIG. 4 is a side schematic view of an alternative re-directing device that may be utilized in the apparatus of FIG. 1.

Another exemplary form that the means for changing the direction of movement of the business from 11 or other web or sheet may take is illustrated schematically in FIG. 4 and comprises a plurality of sets of re-directing rollers 42–44, with or without conventional stationary deflectors 41, 45, 46, 47 associated therewith to facilitate the re-direction. When used the rollers 42–44 typically are powered, or at least one roller of each set is powered, using a common drive or the like. It is to be understood, however, that a wide variety of other re-directing means may also be provided, including any conventional structures capable of performing that function.

Utilizing the apparatus 10 a method of handling business forms with pressure activated adhesive or cohesive 18, 19 (and possibly 20) thereon is provided which may comprise the following: (a) Feeding a business form 11 with pressure activated adhesive or cohesive 18, 19 thereon into and through the first nip 24 (as by using the conveyor, rollers, or merely the output from the conventional folder 22 itself) to effect compression. (b) Changing the direction of movement of the business form 11 to direct the business form toward the second nip 24' (e.g. using the surface 39, the sets of re-directing rollers 42–44, or the like). And (c) feeding the business form 11 into and through the second nip 24' to effect sealing of the pressure activated adhesive or cohesive 18, 19 on that part of the business form between the rollers 26, 27. Preferably (a) through (c) are practiced by driving each of the first through, second, and third rollers 25–27, (c) is practiced to apply a force to the business form 11 between the second and third rollers 26, 27 of between about 100–200 pounds per lineal inch, and (a) is typically practiced to apply a force to the business form 11 between the rollers 25, 26 of between about 100–200 pounds per lineal inch. (a) and (c) are also typically practiced to operate on two different forms 11 at the same time. The method may be practiced on a business form having the pressure activated cohesive or adhesive strips 18, 19 along the two peripheral portions thereof as illustrated in FIG. 2 with (a) and (c) practiced to act substantially only on the peripheral portions of the form. Alternatively, especially where the form 11 has one or more transverse strips of adhesive or cohesive 20, (a) and (c) are practiced to act substantially along the entire width of the business form 11 to also seal the adhesive or cohesive 20 while sealing the strips 18, 19.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of handling folded business forms with pressure activated adhesive or cohesive thereon using at least first, second and third rollers each having an axis of rotation, and the axes of rotation being vertically spaced from each other so that the second roller axis is at a vertical location intermediate the first and third roller axes, and a first nip is formed between the first and second rollers and a second nip is formed between the second and third rollers, said method comprising:

(a) feeding a folded business form with pressure activated adhesive or cohesive thereon into and through the first nip to effect compression;

(b) changing the direction of movement of the folded business form to direct the folded business form toward the second nip; and (c) feeding the folded business form into and through the second nip to effect sealing of the pressure activated adhesive or cohesive on that part of the folded business form between the second and third rollers.

2. A method as recited in claim 1 wherein (c) is practiced to apply a force to the folded business form between the second and third rollers of between about 100–200 pounds per lineal inch.

3. A method as recited in claim 2 wherein (a) is practiced to apply a force to the folded business form between the first and second rollers of between about 100–200 pounds per lineal inch, and wherein (a) and (b) are practiced to operate on two different forms at the same time.

4. A method as recited in claim 1 wherein (b) is practiced by feeding the folded business form into contact with a substantially semi-circular stationary surface.

5. A method as recited in claim 1 wherein the folded business form has pressure activated cohesive or adhesive in strips along two peripheral portions thereof; and wherein (a) and (c) are practiced to act substantially only on the peripheral portions of the form.

6. A method as recited in claim 1 wherein the folded business form has a width substantially transverse to the primary direction that it moves through the nips; and wherein (a) and (c) are practiced to act along substantially the entire width of the folded business form.

7. A method as recited in claim 6 wherein (a)–(c) are practiced using a folded business form having at least some pressure activated adhesive or cohesive extending substantially parallel to the width thereof.

8. A method as recited in claim 1 wherein (a)–(c) are practiced by driving each of the first, second, and third rollers.

9. A method as recited in claim 1 wherein (b) is practiced by using a plurality of sets of re-directing rollers.

10. A method as recited in claim 5 wherein (c) is practiced to apply a force to the folded business form between the second and third rollers of between about 100–200 pounds per lineal inch.

11. A method as recited in claim 10 wherein (a) is practiced to apply a force to the folded business form between the first and second rollers of between about 100–200 pounds per lineal inch, and wherein (a) and (b) are practiced to operate on two different forms at the same time.

12. A method as recited in claim 10 wherein (a)–(c) are practiced by driving each of the first, second, and third rollers.

13. A method as recited in claim 1 wherein (a)–(c) are practiced with the roller axes substantially vertically aligned, and wherein (a) and (c) are practiced to operate on two different forms at the same time.

14. Sealing apparatus, comprising:

a plurality of rollers, including at least first, second, and third rollers, each having an axis of rotation, and the axes of rotation being substantially vertically aligned with each other and the second roller axis provided at a vertical location intermediate the first and third roller axes;

a first nip formed between the first and second rollers, and a second nip formed between the second and third rollers; and means for changing the direction of movement of a web or sheet passing through the first nip to direct the web or sheet toward the second nip, while the web or sheet is spaced from the second roller when moving between nips.

15. Sealing apparatus as recited in claim 14 wherein all three of said rollers are driven.

16. Sealing apparatus as recited in claim 15 wherein said second roller is operatively connected to a motor and said first and third rollers are geared to said second roller.

17. Sealing apparatus as recited in claim 14 wherein said plurality of rollers consists of said first, second and third rollers.

18. Sealing apparatus as recited in claim 14 wherein said means for changing the direction of movement of a web or sheet passing through the first nip to direct the web or sheet toward the second nip comprises a substantially semi-circular stationary surface.

19. Sealing apparatus as recited in claim 14 wherein said rollers are positioned and constructed so that said second and third rollers apply a force of between about 100–200 pounds per lineal inch therebetween.

20. Sealing apparatus as recited in claim 19 wherein said rollers are positioned and constructed so that said first and second rollers apply a force of between about 100–200 pounds per lineal inch therebetween.

21. Sealing apparatus as recited in claim 14 wherein at least said first and third rollers comprise segmented rollers, having a central shaft with first and second ends and a roller segment adjacent each end and substantially devoid of roller segments between said ends.

22. Sealing apparatus, comprising:

a plurality of rollers consisting essentially of first, second, and third rollers, each having an axis of rotation, said axes of rotation being vertically spaced form each other so that the second roller axis is at a vertical location intermediate the first and third roller axes;

a first nip formed between the first and second rollers, and a second nip formed between the second and third rollers; and wherein said rollers are positioned and constructed so that said second and third rollers apply a force of at least about 100 lineal pounds per square inch therebetween, and said first and second rollers apply a force of at least about 100 pounds per lineal inch therebetween.

23. Sealing apparatus as recited in claim 22 wherein all three of said rollers are driven, and wherein said first roller is below said second roller.

24. Sealing apparatus as recited in claim 14 wherein said means for changing the direction of movement of a web or sheet passing through the first nip to direct the web or sheet toward the second nip comprises a plurality of sets of re-directing rollers.

25. Sealing apparatus as recited in claim 24 further comprising a plurality of stationary deflectors associated with said plurality of sets of re-directing rollers for changing the direction of movement of a web or sheet.

26. Sealing apparatus, comprising:

a plurality of rollers, including at least first, second, and third rollers, each having an axis of rotation, and the axes of rotation being substantially vertically aligned with each other and the second roller axis provided at a vertical location intermediate the first and third roller axes;

a first nip formed between the first and second rollers, and a second nip formed between the second and third rollers; and a substantially semi-circular stationary surface for changing the direction of movement of a web or sheet passing through the first nip to direct the web or sheet toward the second nip.

27. A method of handling business forms with pressure activated adhesive or cohesive thereon using at least first, second and third rollers each having an axis of rotation, and the axes of rotation being vertically spaced from each other so that the second roller axis is at a vertical location intermediate the first and third roller axes, and a first nip is formed between the first and second rollers and a second nip is formed between the second and third rollers, said method comprising:

(a) feeding a business form with pressure activated adhesive or cohesive thereon into and through the first nip to effect compression;

(b) changing the direction of movement of the business form to direct the business form toward the second nip by feeding the business form into contact with a substantially semi-circular stationary surface; and (c) feeding the business form into and through the second nip to effect sealing of the pressure activated adhesive or cohesive on that part of the business form between the second and third rollers.

* * * * *